US012800105B2

(12) United States Patent
Han et al.

(10) Patent No.: US 12,800,105 B2
(45) Date of Patent: Nov. 17, 2026

(54) LIQUEFIER INSULATION SYSTEM, AND LIQUEFIER TO WHICH SAME IS APPLIED

(71) Applicant: HYLIUM INDUSTRIES, INC., Seongnam-si (KR)

(72) Inventors: Dong Won Han, Osan-si (KR); Tae Hyun Kim, Suwon-si (KR); Piotr Stepien, Osan-si (KR); Seo Young Kim, Yongin-si (KR)

(73) Assignee: HYLIUM INDUSTRIES, INC., Seongnam-si (KR)

( * ) Notice: Subject to any disclaimer, the term of this patent is extended or adjusted under 35 U.S.C. 154(b) by 0 days.

(21) Appl. No.: 19/173,904

(22) Filed: Apr. 9, 2025

(65) Prior Publication Data

US 2025/0237353 A1 Jul. 24, 2025

Related U.S. Application Data

(63) Continuation of application No. PCT/KR2023/015719, filed on Oct. 12, 2023.

(30) Foreign Application Priority Data

Oct. 21, 2022 (KR) ........................ 10-2022-0136698

(51) Int. Cl.
*F17C 3/08* (2006.01)

(52) U.S. Cl.
CPC ........ *F17C 3/08* (2013.01); *F17C 2201/0109* (2013.01); *F17C 2203/0391* (2013.01); *F17C 2203/0629* (2013.01); *F17C 2223/0161* (2013.01)

(58) Field of Classification Search
CPC ...... F17C 3/00; F17C 3/02; F17C 3/04; F17C 3/08; F17C 2203/03; F17C 2203/0391
See application file for complete search history.

(56) References Cited

U.S. PATENT DOCUMENTS

| | | | | |
|---|---|---|---|---|
| 2008/0242974 A1* | 10/2008 | Urbahn | G01R 33/31 | |
| | | | 600/420 | |
| 2010/0272634 A1 | 10/2010 | Schwartz et al. | | |
| 2016/0305610 A1* | 10/2016 | Karng | F17C 3/08 | |
| 2018/0180342 A1* | 6/2018 | Dresow | F17C 3/08 | |

FOREIGN PATENT DOCUMENTS

| | | | | |
|---|---|---|---|---|
| CN | 105627694 A | 6/2016 | | |
| JP | 08010937 Y2 | 3/1996 | | |
| JP | H0810937 Y2 * | 3/1996 | | |
| JP | 2007204033 A | 8/2007 | | |
| JP | 2010523204 A | 7/2010 | | |
| KR | 101822263 B1 * | 3/2018 | F17C 13/06 | |
| KR | 102304651 B1 | 9/2021 | | |
| KR | 102384711 B1 | 4/2022 | | |

* cited by examiner

*Primary Examiner* — Javier A Pagan
(74) *Attorney, Agent, or Firm* — NKL LAW; Jae Youn Kim

(57) ABSTRACT

A liquefier insulation system, and a liquefier to which same is applied are provided. The liquefier insulation system according to an embodiment of the present invention comprises: a storage container having an opening that is open at the top thereof; a plurality of baffles, each provided at predetermined intervals in the opening-side inner portion of the storage container; and a vacuum part provided above the plurality of baffles, wherein the vacuum part is disposed such that the lower portion thereof is spaced a predetermined interval from the uppermost baffle from among the plurality of baffles.

6 Claims, 6 Drawing Sheets

LIQUEFIER INSULATION SYSTEM, AND LIQUEFIER TO WHICH SAME IS APPLIED

TECHNICAL FIELD

The present disclosure relates to a liquefier insulation system and a liquefier to which the same is applied, and more specifically, to a technical idea of enabling an additional vacuum space to be provided in baffles conventionally provided at an opening of a storage container in order to improve insulation efficiency of the storage container in which liquefied gas that is liquefied is stored in a liquefier for liquefying a predetermined gas.

Background Art

Various types of gases such as hydrogen, nitrogen, and helium are stored in liquefied form much more efficiently than in gaseous form, so liquefiers for liquefying these gases are widely known.

In order to liquefy and store gases in this way, it is necessary to maintain cryogenic temperatures.

In addition, liquefied gases that are liquefied are easily re-vaporized even when only a small amount of external heat is transferred, so insulation may be very important not only in liquefiers for liquefying gases but also in storage tanks for storing cryogenic fluids such as liquefied gases.

The insulation system for a typical conventional liquefier simply provides a plurality of baffles on the inside of the opening side of a storage container in which liquefied gases are stored.

These plurality of baffles are disposed parallel or nearly parallel to the bottom of the storage container, and each baffle is provided in a manner in which they are stacked at a predetermined interval. The plurality of baffles absorb heat during the process in which the liquefied gas stored in the storage container is re-vaporized, thereby slowing down the vaporization of the liquefied gas, and the baffles, which are cooled by the low temperature of the liquefied gas, may block external heat flowing in from the opening of the storage container, thereby performing the functions of insulating and re-liquefying the liquefier.

However, in the case in which only a plurality of baffles are provided as in the past, there is a problem in that the external heat flowing in from the opening side of the storage container is easily transferred to the plurality of baffles, thereby lowering the insulation performance and reducing the efficiency.

Therefore, a technical idea is required that may more strongly prevent external heat from flowing into the storage container of the liquefier.

PRIOR-ART DOCUMENT

Patent Document

Patent Document 1. Korean Patent (Registration No. 10-2384711, "Liquefied storage tank including heat insulation part")

Disclosure of the Invention

Technical Goals

A technical object to be achieved by the present disclosure is to provide a technical idea that allows for increasing insulation efficiency by providing a separate vacuum space in addition to the plurality of existing baffles in order to prevent external heat from being transferred through the opening of the storage container in which liquefied gas liquefied in a liquefier is stored.

Technical Solutions

A liquefier insulation system according to an embodiment of the present disclosure for achieving the above technical objects may include a storage container in which an opening is formed to be open at an upper end, a plurality of baffles each provided at a predetermined interval inside an opening side of the storage container, and a vacuum part provided above the plurality of baffles, wherein the vacuum part may be disposed such that a lower part of the vacuum part is spaced apart by a predetermined interval from a baffle that is disposed at an uppermost part among the plurality of baffles.

In addition, the storage container may include a lower flange formed to protrude a predetermined length in an outward direction of the storage container so as to surround the opening, and an upper flange provided to be coupled with the lower flange so as to close the opening.

In addition, the liquefier insulation system may further include an insulating member disposed between the lower flange and the upper flange.

In addition, the insulating member may be characterized by including an edge part in which a predetermined range from an edge of the insulating member is formed to be thicker by a predetermined thickness than the remaining range, so that an upper part of the vacuum part may be spaced apart from a lower surface of the insulating member by a predetermined distance.

In addition, the storage container may be characterized by including a storage part in which liquefied gas that is liquefied is stored, and a neck part formed to a predetermined height to have a smaller diameter than the storage part, and the plurality of baffles and the vacuum part may be disposed to be located only inside the neck part.

A liquefier according to an embodiment of the present disclosure for achieving the above technical objects may include a storage container in which an opening is formed to be open at an upper end, and a liquefier insulation system provided in the storage container, wherein the liquefier insulation system may include a plurality of baffles each provided at a predetermined interval inside an opening side of the storage container, and a vacuum part provided above the plurality of baffles, and the vacuum part may be disposed such that a lower part of the vacuum part is spaced apart by a predetermined interval from a baffle that is disposed at an uppermost part among the plurality of baffles.

Advantageous Effects

According to an embodiment of the present disclosure, in a liquefier for liquefying a predetermined gas, there is an effect of improving the insulation efficiency of a storage container in which a liquefied gas is stored with a relatively simple structure.

BRIEF DESCRIPTION OF DRAWINGS

In order to more fully understand the drawings cited in the detailed description of the present disclosure, a brief description of each drawing is provided.

BEST MODE FOR CARRYING OUT THE INVENTION

Figure 1:
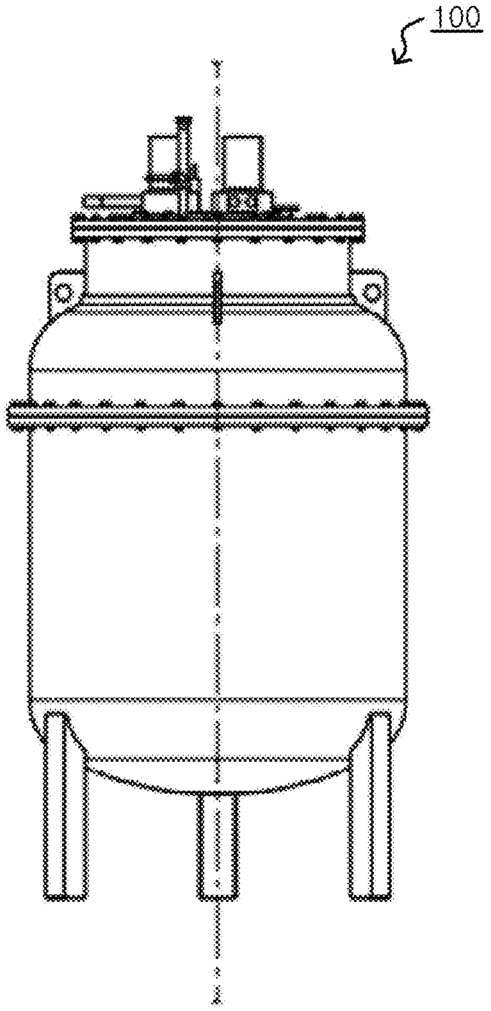
FIG. 1 illustrates a typical form of a liquefier.

Since the present disclosure may apply various transformations and have various embodiments, specific embodiments will be illustrated in the drawings and described in detail in the detailed description. However, this is not intended to limit the present disclosure to specific embodiments, and it should be understood to include all transformations, equivalents and substitutes included in the spirit and scope of the present disclosure. In describing the present invention, if it is determined that a detailed description of related known technologies may obscure the gist of the present disclosure, the detailed description will be omitted.

Terms such as first and second may be used to describe various components, but the components should not be limited by the terms. Such terms are used only for the purpose of distinguishing one component from another.

The terms used in the present application are used only to describe a particular embodiment and are not intended to limit the present disclosure. Singular expressions include plural expressions unless the context clearly means otherwise.

In this specification, it should be understood that terms such as "comprise", "include" or "have" are intended to designate the presence of features, numbers, steps, operations, components, parts, or combinations thereof described in the specification, and do not preclude the possibility of the presence or addition of one or more other features, numbers, steps, operations, components, parts, or combinations thereof.

Hereinafter, with reference to the accompanying drawings, the present disclosure will be described in detail centering on embodiments of the present disclosure. Like reference numerals in each figure indicate like members.

FIG. 1 illustrates a typical form of a liquefier, and FIGS. 2A to 4 illustrate a configuration of a liquefier insulation system according to an embodiment of the present disclosure.

Referring to FIGS. 1 to 4, a liquefier insulation system according to an embodiment of the present disclosure may be provided in a storage container 100 in which a liquefied gas (e.g., hydrogen, or the like) is stored, as illustrated in FIG. 1.

In an embodiment, the storage container 100 may have an opening formed to be open at an upper end, and may include a lower flange 130 formed to protrude a predetermined length in an outward direction of the storage container 100 so as to surround the opening, and an upper flange 140 provided to be coupled with the lower flange 130 so as to close the opening.

In addition, the storage container 100 may include a storage part 110 in which liquefied gas that is liquefied is stored, as illustrated in the drawing, and a neck part 120 formed from the opening by a predetermined length so that a portion of the opening side has a smaller diameter than the storage part.

According to an implementation example, the storage container 100 may have a form in which there is no distinction between the neck part 120 and the storage container 100. In other words, the neck part 120 having a relatively smaller diameter may not be formed separately on the opening side. Even in this case, the technical idea of the present disclosure, which will be described later, may be applied equally. Hereinafter, the description will be made mainly on the case in which the storage container 100 is formed to include the storage part 110 and the neck part 120 having a smaller diameter than the storage part 110, but the present disclosure is not necessarily limited thereto.

According to an embodiment of the present disclosure, the liquefier insulation system may be provided in the neck part of the storage container 100.

A typical conventional insulation system is limited to providing a plurality of baffles 200 on the opening side of the storage container 100, for example, inside the neck part 120.

These plurality of baffles 200 are disposed parallel or nearly parallel to the bottom of the storage container 100, and are provided in a manner in which each baffle is stacked at a predetermined interval. The plurality of baffles absorb heat during the process in which the liquefied gas stored in the storage container 100 and/or the storage part 110 of the storage container 100 is re-vaporized, thereby slowing down the vaporization of the liquefied gas, and the baffles, which are cooled by the low temperature of the liquefied gas, may block external heat flowing in from the opening of the storage container 100, thereby performing the functions of insulation and re-liquefaction of the liquefier. The technical idea in which the plurality of baffles 200 are used for insulation and/or re-liquefaction of cryogenic fluid is widely known in various fields such as liquefiers as well as cryogenic fluid storage tanks that store cryogenic fluid, and therefore, a detailed description thereof will be omitted in this specification.

However, in the case where only a plurality of baffles are provided as in the related art, there is a problem in that the external heat flowing in from the opening side of the storage container 100 is easily transferred to the plurality of baffles, thereby lowering the insulation performance and reducing the efficiency.

Therefore, the present disclosure provides a technical idea in which, even if the number of baffles is somewhat reduced, a vacuum part 300 having a vacuum space 350 is disposed between the baffles and the upper flange 140, thereby further suppressing the transfer of external heat to the baffles 200.

Figure 2A:
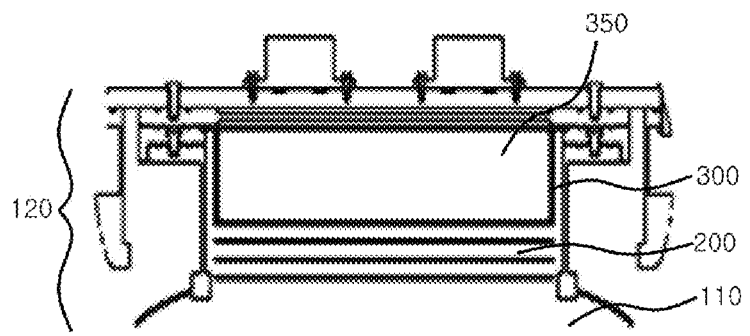
FIGS. 2A to 4 illustrate a configuration of a liquefier insulation system according to an embodiment of the present disclosure.
Figure 2B:
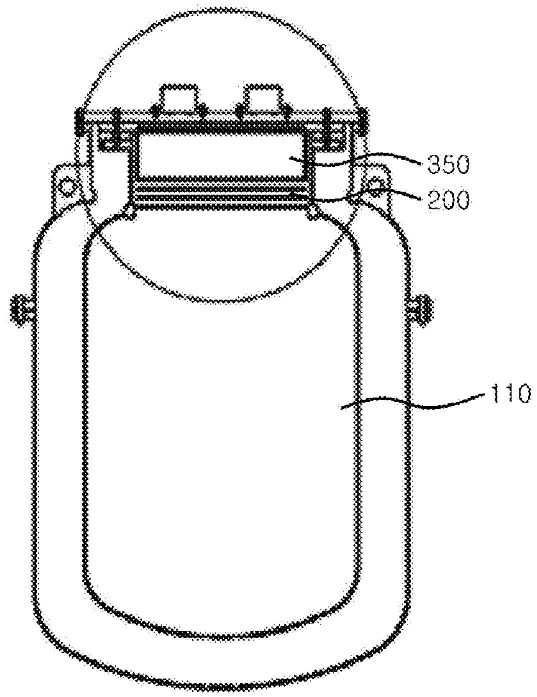
Figure 3:
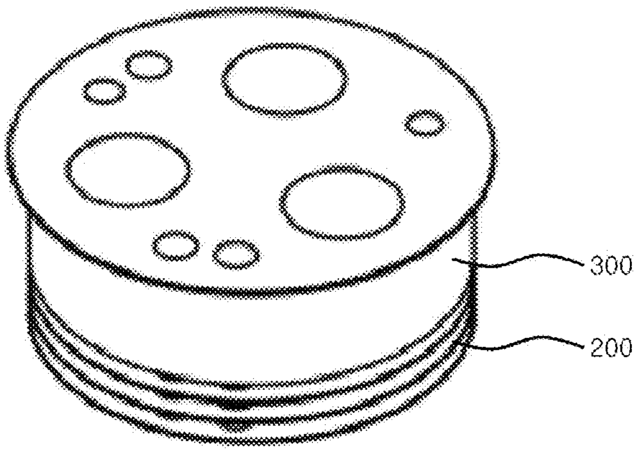
Figure 4:
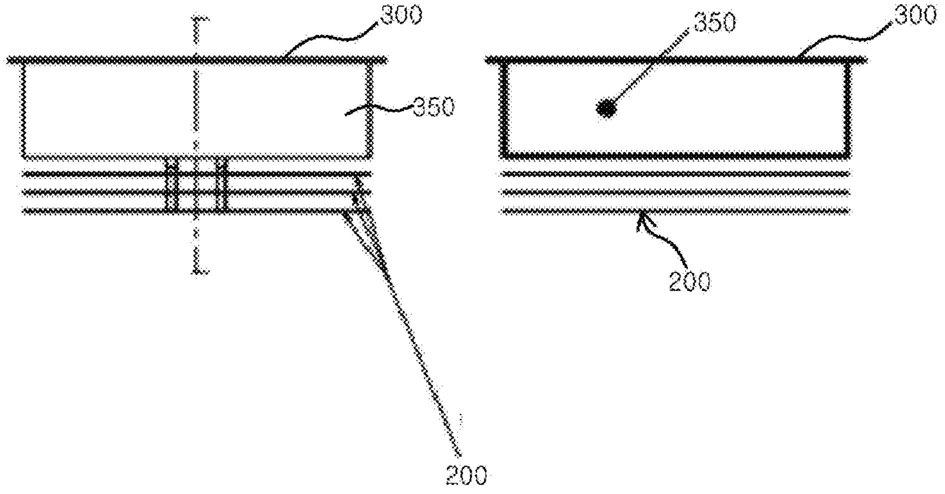

Referring to FIGS. 2A-2B, the liquefier insulation system according to the technical idea of the present disclosure may include a plurality of baffles 200 provided inside the opening side of the storage container 100, and a vacuum part 300 disposed above the plurality of baffles 200.

According to an embodiment of the present disclosure, the vacuum part 300 may be formed to have a box shape having a shape (for example, a cylindrical shape) that may be inserted into the neck part 120 or the opening of the storage container 100. At this time, the interior of the box shape maintains a vacuum state so that a vacuum space is secured.

The shape of the vacuum part 300 and/or the baffles 200 may vary depending on the cross-sectional shape of the opening or the neck part 120 of the storage container 100.

The plurality of baffles 200 may be disposed at a predetermined interval below the vacuum part 300.

According to an implementation example, the liquefier insulation system may further include a predetermined insulating member 150 disposed between the lower flange 130 and the upper flange 140 of the storage container 100 described above.

In an embodiment, the insulating member 150 may be formed of a material having low thermal conductivity, for example, a G10 material.

The insulating member 150 may be formed to have an area sufficient to cover the entire opening of the storage container 100. In addition, as described above, the insulating member 150 is located between the upper flange 140 and the lower flange 130, thereby preventing the vacuum part 300 from directly contacting or approaching the upper flange 140, thereby extremely suppressing heat from the outside from being transferred into the interior of the storage container 100.

Figure 5:
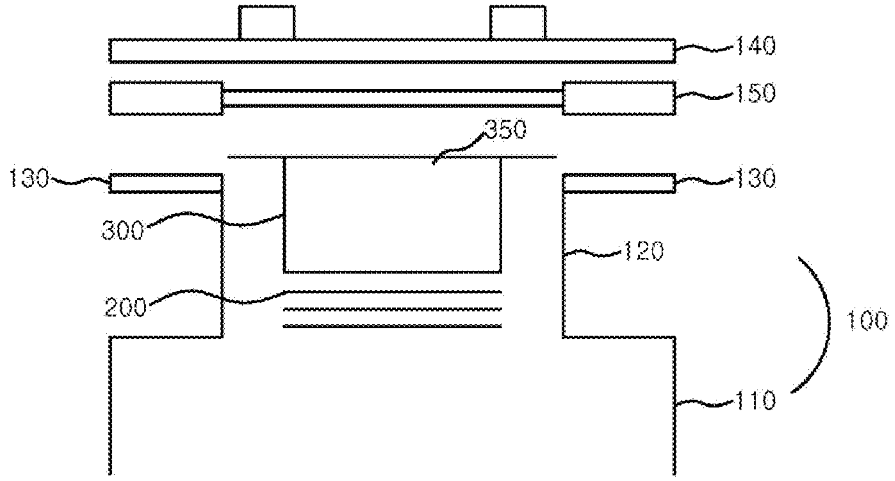
FIG. 5 is a diagram for explaining a method of fastening a liquefier insulation system according to an embodiment of the present disclosure.

The plurality of baffles 200 may be fixed at a predetermined interval by a predetermined fixing means as illustrated in FIG. 5. The fixing means may be implemented in various forms as long as it may fix the plurality of baffles 200 along the A-axis of the drawing. For example, the fixing means may be implemented by a combination of bolts and nuts, or may be implemented in a predetermined pin shape.

According to an implementation example, the fixing means may fix the plurality of baffles 200 by penetrating the plurality of baffles 200 at a predetermined location, and may be coupled to the lower end of the vacuum part 300 to fix the plurality of baffles 200 and the vacuum part 300 together.

FIG. 5 is a diagram for explaining a method of fastening a liquefier insulation system according to an embodiment of the present disclosure.

Referring to FIG. 5, a liquefier insulation system according to an embodiment of the present disclosure may be configured to include a plurality of baffles 200 provided inside a neck part 120 of a storage container 100, and a vacuum part 300 provided on an upper end of the plurality of baffles 200.

Although the plurality of baffles 200 and the vacuum part 300 are illustrated in the drawing as being spaced apart from the inner surface of the neck part 120 of the storage container 100 by a predetermined distance, this may be an example illustrated to facilitate visual distinction of each component in the drawing. In reality, edges of the plurality of baffles 200 and the side surfaces of the vacuum part 300 may be formed to be in contact with the inner surface of the neck part 120 of the storage container 100, or may be formed to be very close to, but not in contact with, the inner surface of the neck part 120 of the storage container 100.

When the liquefier insulation system includes the insulating member 150 as described above, the insulating member 150 may be disposed to cover the opening of the storage container 100 above the vacuum part 300 as described above.

At this time, in order to prevent the insulating member 150 from being in direct contact with an upper part of the vacuum part 300, a predetermined range (hereinafter, referred to as an "edge part") from the edge of the insulating member 150 may be formed to have a thicker thickness than the remaining range.

In an embodiment, the edge part of the insulating member 150 may be formed to have a width equal to the width of the lower flange 130 or slightly narrower than the width of the lower flange 130 as illustrated in the drawing.

Due to the edge part of the insulating member 150, the upper part of the vacuum part 300 and the lower surface of the insulating member 150 do not directly contact each other in the opening of the storage container 100 and a predetermined interval is generated. It will be easily inferred to an average expert in the field to which the present disclosure pertains that this interval, which may avoid direct contact between each component, may more effectively suppress heat transfer from the outside and improve the insulation effect.

Meanwhile, according to another embodiment of the present disclosure, the liquefier insulation system may include a second insulating member separate from the insulating member 150 when the insulating member 150 is fastened. An example of this is illustrated in FIG. 6.

Figure 6:
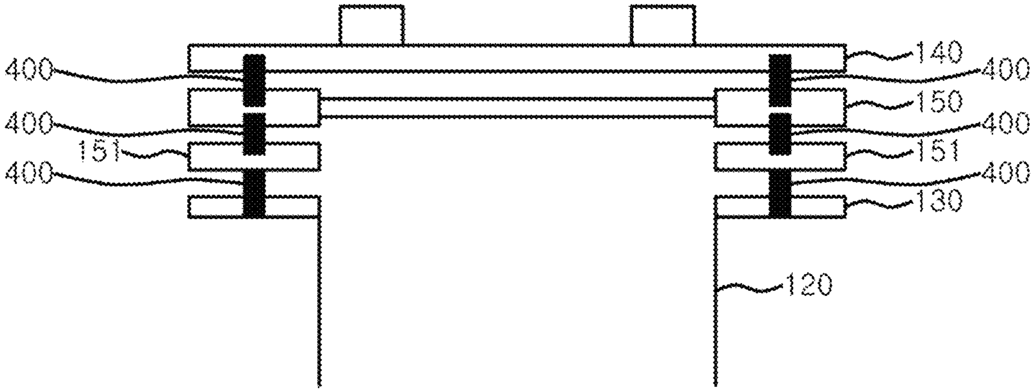
FIG. 6 is a diagram for explaining a method of fastening a liquefier insulation system according to another embodiment of the present disclosure.

FIG. 6 is a diagram for explaining a method of fastening a liquefier insulation system according to another embodiment of the present disclosure.

Referring to FIG. 6, the liquefier insulation system may include an insulating member 150 and a second insulating member 151 disposed between the lower flange 130 formed on the outside of the neck part 120 of the storage container 100 and the upper flange 140 that closes the opening of the storage container 100 as described above.

The insulating member 150 is the same as described above, and the second insulating member 151 may be formed to have a width that is the same as or similar to the width of the edge part of the insulating member 150 and/or the width of the lower flange 130 while having a ring shape in which a central portion of a predetermined range, for example, a part corresponding to the opening of the storage container 100, is empty.

In addition, the upper flange 140 and the insulating member 150 may be fixed by a fixing means 400, the insulating member 150 and the second insulating member 151 may be fixed by a separate fixing means 400, and the lower flange 130 and the second insulating member 151 may be fixed by another fixing means 400.

This structure may have the effect of making the connection between the upper flange 140, the lower flange 130 and the insulating members more solid, while increasing the interval between the upper end of the vacuum part 300 and the lower surface of the insulating member 150 to somewhat improve the insulating effect.

The above description of the present disclosure is for illustrative purposes, and those skilled in the art to which the present disclosure pertains will understand that the present disclosure may be easily modified into other specific forms without changing the technical idea or essential features of the present disclosure. Therefore, the embodiments described above should be understood in all respects as illustrative and not restrictive. For example, each component described as unitary may be implemented in a distributed manner, and similarly, components described as distributed may also be implemented in a combined form.

The scope of the present disclosure is indicated by the appended claims rather than the detailed description above, and all changes or modified forms derived from the meaning and scope of the claims and their equivalent concepts should be construed as being included in the scope of the present disclosure.

INDUSTRIAL APPLICABILITY

The present disclosure may be used for a liquefier insulation system and liquefaction using the same.

The invention claimed is:

1. A liquefier insulation system comprising:

a storage container in which an opening is formed to be open at an upper end;

a plurality of baffles each provided at a predetermined interval inside an opening side of the storage container; and a vacuum part provided above the plurality of baffles, wherein the vacuum part is disposed such that a lower part of the vacuum part is spaced apart by a predetermined interval from a baffle that is disposed at an uppermost part among the plurality of baffles, and is configured to suppress heat transfer toward the plurality of baffles.

2. The liquefier insulation system of claim 1, wherein the storage container comprises:

a lower flange formed to protrude a predetermined length in an outward direction of the storage container so as to surround the opening; and an upper flange provided to be coupled with the lower flange so as to close the opening.

3. The liquefier insulation system of claim 2, further comprising an insulating member disposed between the lower flange and the upper flange.

4. The liquefier insulation system of claim 3, wherein the insulating member comprises an edge part in which a predetermined range from an edge of the insulating member is formed to be thicker by a predetermined thickness than the remaining range, so that an upper part of the vacuum part may be spaced apart from a lower surface of the insulating member by a predetermined distance.

5. The liquefier insulation system of claim 1, wherein the storage container comprises:

a storage part in which liquefied gas that is liquefied is stored; and a neck part formed to a predetermined height to have a smaller diameter than the storage part, wherein the plurality of baffles and the vacuum part are disposed to be located only inside the neck part.

6. A liquefier comprising:

a storage container in which an opening is formed to be open at an upper end; and a liquefier insulation system provided in the storage container, wherein the liquefier insulation system comprises:

a plurality of baffles each provided at a predetermined interval inside an opening side of the storage container; and a vacuum part provided above the plurality of baffles, and the vacuum part is disposed such that a lower part of the vacuum part is spaced apart by a predetermined interval from a baffle that is disposed at an uppermost part among the plurality of baffles, and is configured to suppress heat transfer toward the plurality of baffles.

* * * * *